Nov. 17, 1925.　　　　W. C. KILIUS ET AL　　　　1,561,937
THERMOCONTAINER
Filed Oct. 4, 1922
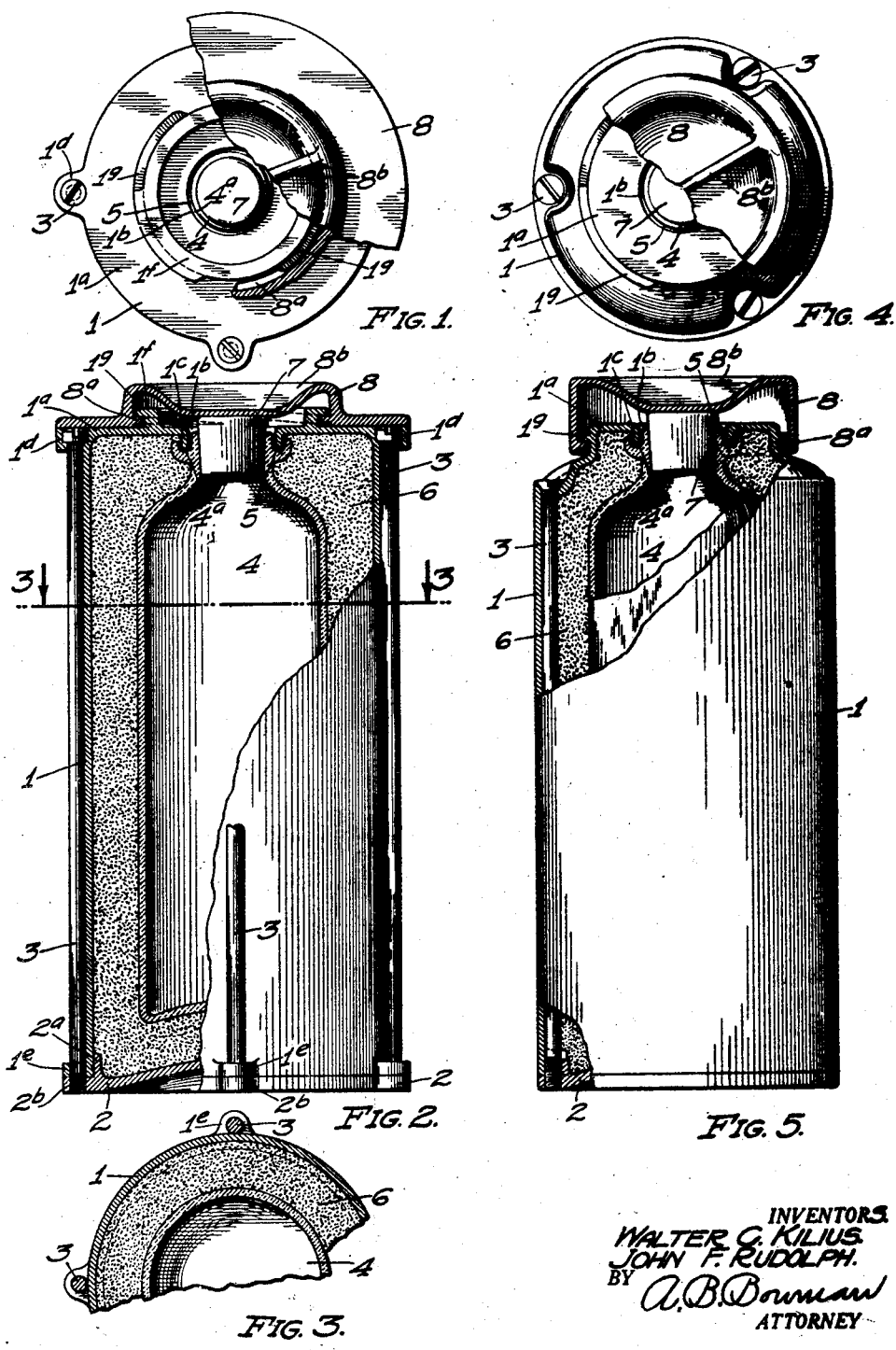
INVENTORS
WALTER C. KILIUS.
JOHN F. RUDOLPH.
BY
A. B. Bowman
ATTORNEY Patented Nov. 17, 1925.

1,561,937

UNITED STATES PATENT OFFICE.

WALTER C. KILIUS AND JOHN F. RUDOLPH, OF LOMPOC, CALIFORNIA; SAID RUDOLPH ASSIGNOR TO SAID KILIUS.

THERMOCONTAINER.

Application filed October 4, 1922. Serial No. 592,349.

*To all whom it may concern:*

Be it known that we, WALTER C. KILIUS and JOHN F. RUDOLPH, citizens of the United States, residing at Lompoc, in the county of Santa Barbara and State of California, have invented a certain new and useful Thermocontainer, of which the following is a specification.

Our invention relates to thermo containers, particularly to thermo bottles, and the objects of our invention are: first, to provide a novel and efficient thermo container which will keep products cold or hot as desired; second, to provide a thermo container which cannot easily be distorted or broken by slight impact or by dropping the same; third, to provide a container of this class with a novel and highly efficient heat insulating means; fourth, to provide a container of this class in which the insulating medium supports the container and casing members relatively and rigidly with each other; fifth, to provide a container of this class in which the cover forces the stopper into the neck of the container and holds the stopper in said position while the cover is in place; sixth, to provide a novelly constructed thermo container and one, in which the casing thereof is readily separable for replacing the inner container; and seventh, to provide a container of this class which is very simple and economical of construction, particularly durable, efficient and which will not readily deteriorate or get out of order.

With these and other objects in view as will appear hereinafter our invention consists of certain novel features of construction, combination and arrangement of parts and portions as will be hereinafter described in detail and particularly set forth in the appended claims, reference being had to the accompanying drawings and to the characters of reference thereon which form a part of this application, in which:

Figure 1 is a plan view of our thermo container with the cover thereof partially broken away; Fig. 2 is an elevational view thereof showing certain parts and portions broken away and in section to facilitate the illustration; Fig. 3 is a fragmentary sectional view thereof taken through 3—3 of Fig. 2; Fig. 4 is a plan view of a slightly modified form of construction of our thermo container with the cover thereof shown fragmentarily and Fig. 5 is side elevational view thereof showing certain parts and portions broken away and in section to facilitate the illustration.

Like characters of reference refer to similar parts and portions throughout the several views of the drawings.

The upper casing member 1, lower casing member 2, reinforcing tie rod members 3, container 4, gasket 5, insulating material 6, stopper 7 and the cover 8 constitute the principal parts and portions of our thermo container in its preferred form.

The upper casing member 1 is preferably cylindrical in shape and provided at its upper end with a cover portion $1^a$ integrally secured to the cylindrical portion of the member 1. Said cover portion $1^a$ is provided with a central opening $1^b$ and with a downwardly extending annular flange portion $1^c$ contiguous to said opening therein. The lower casing member 2 is provided with an inwardly extending flange portion $2^a$ which extends into and engages the inner side of the cylindrical portion of the member 1, positioning the members 1 and 2 laterally with each other. Said casing members 1 and 2 are secured together by the reinforcing and tie rod members 3 in the form of bolts which extend through lugs $1^d$ provided at the upper end of the casing member 1 and similar guide lugs $1^e$ at the lower portion of the casing member 1 and into the internally threaded lugs $2^b$ which extend outwardly from the lower casing member 2. The container 4 is preferably made of glass and is provided at the upper outer portion of its neck with an annular groove $4^a$ for the reception of the annular flange $1^c$ of the casing member 1, which flange is adapted to position the container 4 laterally within the casing 1. A gasket 5, preferably made of cork, is interposed between the flange portion of the member 1 and the groove portion of the neck of the container 4, to reduce the waste of heat by conductivity to a minimum. An insulating material 6, which consists preferably of a dehydrated diatomaceous product sometimes known as diatomaceous earth consisting of microscopic forms of diatoms or hollow cells. This insulating material is packed in the space between the casing and container to prevent movement of the latter within the former which strengthens the container and casing against breakage or distortion, and has been found to be a highly efficient and economical insulating material for this purpose. The cover portion 1ᵃ is provided with an upwardly extending annular flange portion 1ᶠ intermediate its periphery and central opening and is provided on the periphery thereof with fragmentary portions of threads 1ᵍ which are adapted to engage similar thread portions on the inner side of the cover 8 which is held in position against the upper portion of the casing by said portions. Said cover is preferably made cup shape at its central portion to engage at its lower side the stopper 7 provided in the neck of the container 4 and hold said stopper in said position when screwed against the cover portion of the casing 1. A web 8ᵇ extends across the cup shaped portion of the cover 8 to facilitate the securing of the cover in position.

In the modified form of construction we have shown a similar casing 1, although with a slightly rounded upper portion and the reinforcing and tie rod members, extending from the upper to the lower ends thereof, positioned within said casing against the wall thereof. The slightly offset portion at the upper end of the container as shown in Fig. 5 of the drawings in the modified form of construction is provided with similar fragmentary thread portions as previously described in connection with the preferred structure, which is adapted to engage similar thread portions on the inside of the cover 8, which cover in this modified form of construction is somewhat smaller than the structure previously described.

Though we have shown and described a particular construction, combination and arrangement of parts and portions and a certain modification thereof, we do not wish to be limited to this particular construction, combination and arrangement nor to the modification, but desire to include in the scope of our invention the construction, combination and arrangement substantially as set forth in the appended claims.

It is obvious from the drawings and foregoing description that we have provided a thermo container which cannot easily be distorted or broken by slight impact or by dropping the same; that we have provided a container of this class with novel and highly efficient heat insulating material; in which the insulating material supports the container and casing members relatively and rigidly with each other; in which the cover forces the stopper into the neck of the container and holds the stopper in said position while the cover is in place; that we have provided a novelly constructed container of this class and that we have provided a container of this class which is very simple and economical of construction, particularly durable, efficient and which will not readily deteriorate or get out of order.

Having thus described our invention what we claim as new and desire to secure by Letters Patent is:

1. A container of the class described, including a sectional casing, reinforcing and tie members extending the length of said casing securing said casing sections to each other and reinforcing said receptacles, a container positioned within said casing and a diatomaceous insulating material positioned in the space between the casing and said container positioning the same relatively to each other.

2. A container of the class described, including a sectional casing provided with an opening in one end, reinforcing and tie members extending the length of said casing securing said casing sections to each other and reinforcing said casing, a container positioned within said casing with its opening contiguous to the opening of said casing, a diatomaceous insulating material positioned in the space between the casing and said container positioning the same relatively to each other, a loose heat insulating gasket interposed between the inside of said casing, contiguous to the opening therein, and said container and a stopper for said container.

3. A container of the class described, including a sectional casing provided with an opening in one end, reinforcing and tie members extending the length of said casing securing said casing sections to each other and reinforcing said casing, a container positioned within said casing with its opening contiguous to the opening of said casing, a diatomaceous insulating material positioned in the space between the casing and said container positioning the same relatively to each other, a loose heat insulating gasket interposed between the inside of said casing, contiguous to the opening therein, and said container, a yieldable stopper for said container and a cover positioned over the opening of said casing and secured to said casing adapted to engage the outer end of said stopper and force the same into said container when being secured to said casing.

4. A container of the class described, including a separable sectional casing provided with an opening in one end, reinforcing tie members separably securing said casing sections to each other, a container, provided with a similar opening loosely positioned within said casing with its opening contiguous to the opening of said casing, a diatomaceous heat insulating material positioned and packed in the space between the casing and said container positioning the same relatively to each other, a heat insulating gasket loosely interposed between the inside of said casing and said container contiguous to their respective openings, a yieldable stopper for said container and a cover positioned over the opening of said casing and secured to said casing adapted to engage the outer end of said stopper and force the same into the opening of said container when being secured to said casing.

5. A container of the class described, including a separable sectional casing provided with an opening in one end, tie-bolts screwably securing said casing sections together, a container, provided with an opening at one end, loosely positioned within said sectional casing, and a heat insulating material contained in one of said casing sections and packed therein positioning said container relatively thereto, said heat insulating material being packed therein with the securing of said casing sections together.

In testimony whereof, we have hereunto set our hands at Lompoc, California, this 22 day of September, 1922.

WALTER C. KILIUS.
JOHN F. RUDOLPH.